H. SYNCK.
MANURE DISTRIBUTER.
APPLICATION FILED APR. 11, 1913.
1,099,135.
Patented June 2, 1914.
3 SHEETS—SHEET 1.
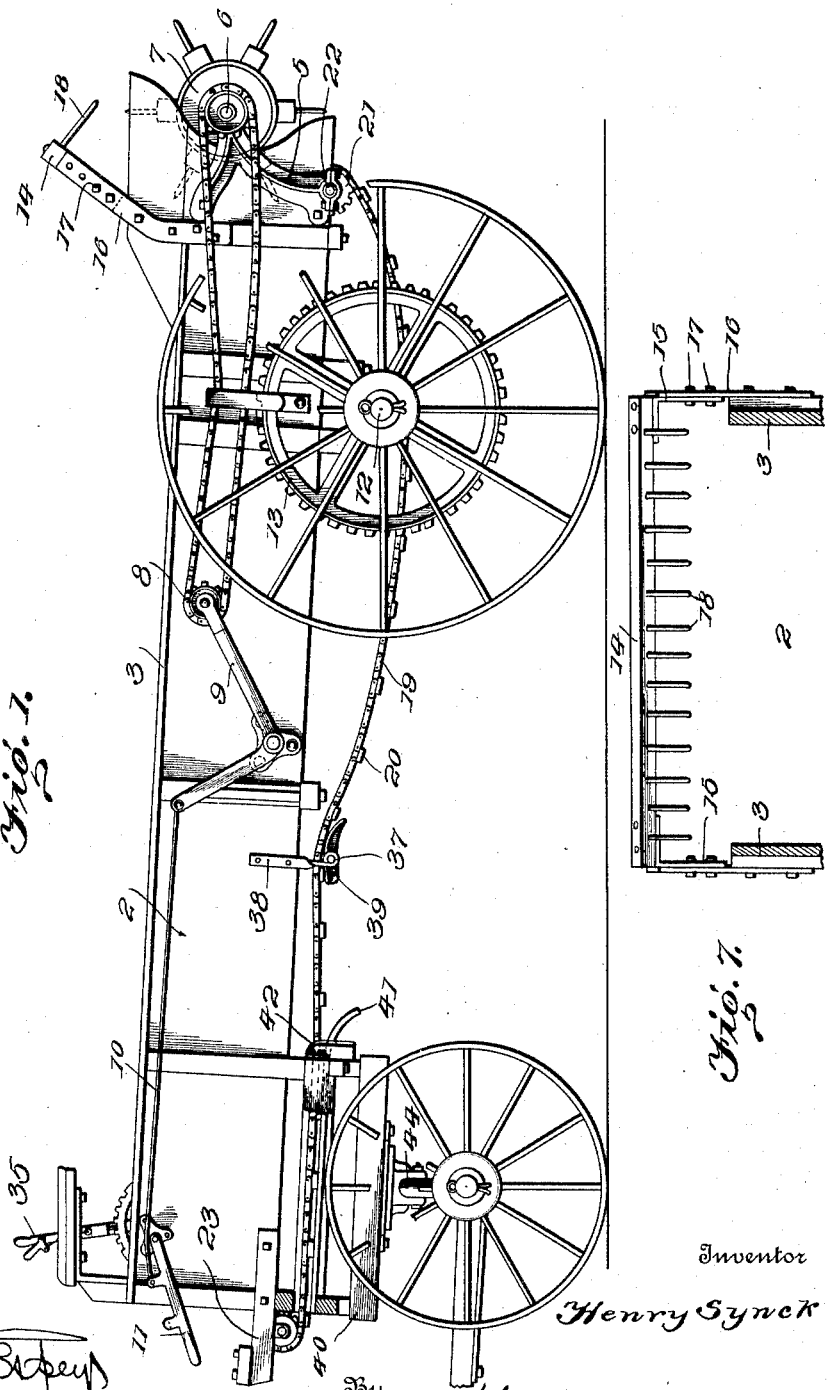
Inventor
Henry Synck

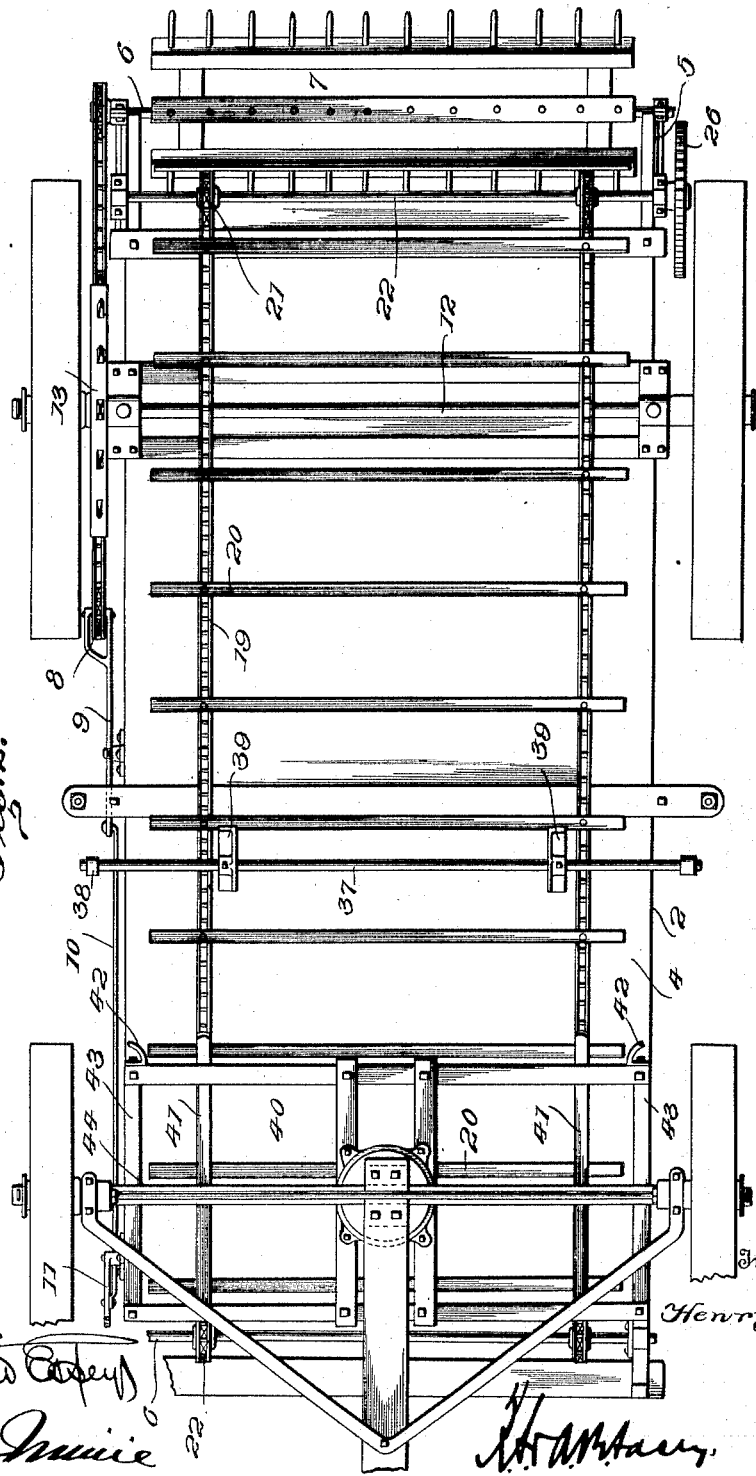

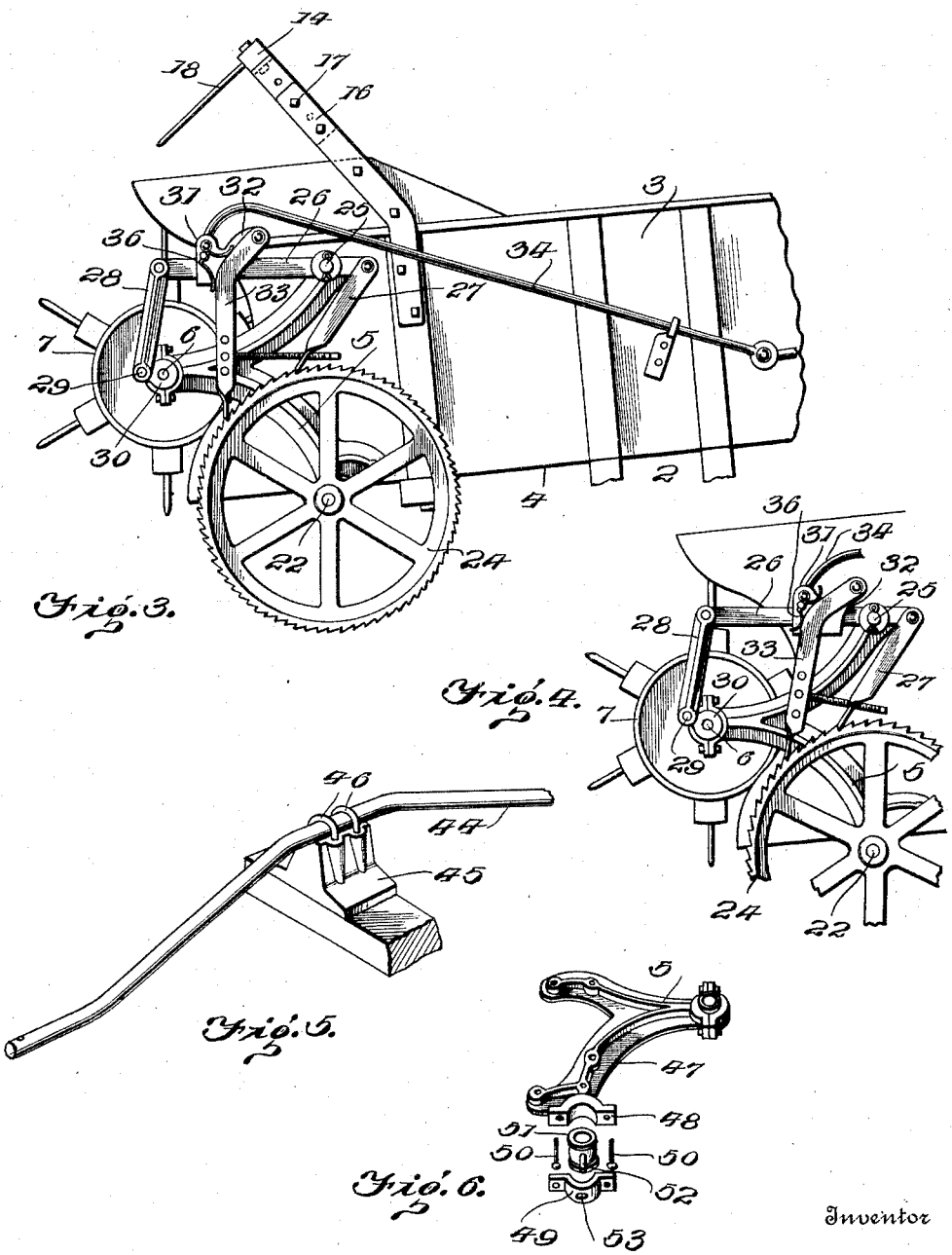

UNITED STATES PATENT OFFICE.

HENRY SYNCK, OF COLDWATER, OHIO.

MANURE-DISTRIBUTER.

1,099,135.

Specification of Letters Patent.

Patented June 2, 1914.

Application filed April 11, 1913. Serial No. 760,510.

*To all whom it may concern:*

Be it known that I, HENRY SYNCK, citizen of the United States, residing at Coldwater, in the county of Mercer and State of Ohio, have invented certain new and useful Improvements in Manure-Distributers, of which the following is a specification.

My invention relates to manure distributers, and particularly to that variety of manure distributer in which there is a box-like body provided with a beater at the rear end thereof and a scatterer, and in which the manure is conveyed to the beater and scatterer by means of an endless conveyer disposed along the floor of the body.

One object of my invention is to improve the construction of the manure spreader generally so that the various parts thereof will be more positively operated, simpler in construction and more cheaply manufactured without diminishing the effectiveness of the apparatus.

Another object is to improve the means whereby the manure is fed forward to the beater, and in this connection to so construct the feed actuating mechanism that the feed may be readily adjusted to suit varying circumstances so as to secure either a relatively rapid feed, a relatively slow feed, or no feed at all, and further to so construct the feeding pawl and the slide for the same that the pawl will tend to hold the slide in position upon its supporting bar and prevent accidental displacement of this slide.

A further object is to provide means which will act to hold the sides of the bed or body of the wagon in proper parallel relation against strain, this means further acting as an adjustable rake, preventing the passage of too great masses of material to the beater, this rake being adjustable to suit different circumstances of operation.

A third object of the invention is to provide means for properly guiding the lower flight of the conveyer beneath the wagon bed so that the cross strips of the conveyer will not catch and so that the conveyer shall not sway back and forth in passing beneath the forward bolster.

A further object is to provide in connection with a bent forward axle, means for supporting the rear end of the pole on the middle or bent portion of the axle but at a distance below this bent portion so that the rear end of the pole shall not be raised up to such a height as will cause the pole to bind under the framework of the machine when making short turns.

Other objects will appear in the course of the following description.

My invention is illustrated in the accompanying drawings wherein:

Figure 1 is a side elevation of a manure distributer constructed in accordance with my invention. Fig. 2 is a bottom plan view of the distributer shown in Fig. 1. Fig. 3 is a side elevation of the rear end of the distributer showing the conveyer actuating mechanism and feed adjustment. Fig. 4 is a fragmentary side elevation similar to Fig. 3 but showing a different position of the pawl carrying slide. Fig. 5 is a detail perspective view of the bowed front axle and the butt end of the tongue connected thereto. Fig. 6 is a perspective detail view of the bearing for the rear conveyer shaft. Fig. 7 is a rear elevation of the combined brace and retaining rake, the sides of the wagon body being shown in section.

Corresponding and like parts are referred to in the following description and indicated in all the views of the accompanying drawings by the same reference characters.

Referring now to Fig. 1, 2 designates the body of a manure distributer of the character referred to, this body including the upstanding sideboards 3 and a bottom 4. Mounted at the rear end of the body in supporting brackets 5 is the shaft 6 of a beater 7 of any ordinary or usual construction. This beater is shown as comprising end disks and transversely extending bars provided with outwardly projecting pins. This is a common form of beater and I do not wish to be limited to this form. This beater is illustrated as being driven by means of a sprocket chain passing over a sprocket wheel on the shaft of the beater and at its other end passing around a sprocket wheel 8 carried upon an angular lever 9 mounted upon one of the sideboards of the body, this angular lever being in turn connected to an actuating rod 10 extending to the front of the machine and there connected to an actuating lever 11 of any suitable character. The rear axle 12 of the machine carries not only the usual traction wheels but also the sprocket wheel 13 which is adapted to engage the links of the chain 7. When this sprocket chain 7 is lowered by lowering the lever 9, the lower flight of the chain will be brought in engagement with the sprocket wheel 13 which will cause a rotation of the beater.

In manure distributers of the character stated, the strain upon the sideboards 3 caused by the moving load, tends to deform these sideboards and throw them out of their rectangular relation to the wagon bed. In order to hold these sideboards in proper relation and brace them against these strains, I provide the transversely extending bar 14 which at its ends is provided with angle irons 15, the downwardly extending branches of which are perforated with a plurality of holes. Extending upward from the rear end of the sideboards 3 and attached thereto in any suitable manner are the irons 16 which are likewise pierced with a plurality of holes. These irons preferably extend upward and rearward and the angle irons 15 are engaged therewith by means of bolts 17, preferably two bolts on a side. This forms an arch-shaped brace which braces the rear corners of the side boards and prevents them being thrown out of parallel relation. The bar 14 not only acts as a brace supporting these sideboards, but also acts to support a plurality of rearwardly and downwardly projecting rake teeth 18. These rake teeth extend downward and rearward so that the ends of the rake teeth are in a line vertically above the shaft 6 which supports the beater. By adjusting the bars 14 and 15 vertically downward or upward, the distance between the teeth 18 and the teeth of the beater may be increased or decreased so as to regulate the amount of material which will be drawn outward by the action of the beater, the rakes acting to prevent surplus material being engaged and carried out by the beater teeth.

Moving along the bottom 4 of the wagon bed or body is a conveyer consisting of the laterally spaced sprocket chains 19 and the transverse rods 20 carried thereby. The sprocket chains are set inward from the sides 3 a distance of some eight or ten inches, but the rods 20 have a length nearly equal to the inside width of the body or bed. The sprocket chains 19 extend around beneath the bottom of the wagon or bed and pass over rear sprocket wheels 21 mounted upon a shaft 22. At their forward ends, the chains pass beneath the footboard 23 of the wagon body. The means whereby the upper flight of this conveyer is shifted rearward as the distributer moves over a field is as follows: Mounted upon the shaft 22 at one end thereof is a ratchet wheel 24 and projecting from the bracket 5 in a line immediately above the shaft 21 is a stud 25. Mounted upon this stud for oscillation is a lever 26 having a long and a short arm, the long arm projecting rearward and the short arm forward. This lever is formed with a bearing which fits over the stud 25, and a cotter pin is used for the purpose of holding the lever in place upon the stud. Pivoted to the forward or short arm of the lever 26 is a downwardly and forwardly projecting pawl 27, the extremity of which engages with the ratchet teeth on the wheel 24. The rear end of the lever 26 is connected by means of a pivoted link 28 to a crank wrist pin 29 mounted upon a crank 30, in turn fast on the shaft 6. It will be obvious, therefore, that as the shaft 6 rotates, the lever 26 will be oscillated in a vertical plane. Mounted upon the lever 26 is a slide 31 which embraces the lever and which is formed with an upwardly and forwardly projecting arm 32. To the extremity of this arm is pivoted a pawl 33. This pawl for the greater portion of its length is vertical but the upper end of the pawl is upwardly and forwardly turned and its extremity is pivoted to the end of the arm 32. The lower end of this pawl engages the ratchet teeth on wheel 24. Attached to the slide 31 and adapted to shift this slide longitudinally along the bar 26, is a rod 34 which extends to the front end of the machine and is within the control of the operator by means of a lever 35.

A feeding device that does not feed steadily is not of much value as it will spread unevenly. The usual eccentric feed or hammer and anvil feed is not steady and is hard on the other machinery. The feed heretofore described, however, is entirely steady and it can spread from five and one-half to sixteen and one-half loads per acre. Particular attention is called to the fact that the slide 31 is provided with the rearwardly and upwardly extending arm 32 to the extremity of which the pawl 33 is pivoted. This has the following function, that when the slide is shifted forward on the bar 26 to its full extent, the pivotal point of the pawl 33 will be immediately above the pivotal point 25 of the bar 26 and that hence the pawl 33 will not be actuated and no feed, or practically no feed will occur. The pawl 27 acts as a back stop to the ratchet so as to prevent the ratchet moving reversely while the pawl 33 is moving upward, and secondly it will help feed the ratchet wheel, thus relieving the pawl 33 of some of its work and thus securing an evener feed than if the ratchet 24 were not feeding at all. There is a further advantage in having the arm 32 extending forward from the slide in that this has a tendency to lock the slide 33 upon the bar 1 so that it will not slide by itself, which it might do if the pawl 33 were connected to the slide midway of the slide. A spring 36 also engages the pawl 33 to hold the pawl in engagement with the ratchet when the pawl has a perpendicular position. Without this spring, the pawl might swing away from the ratchet wheel. I have also improved the means for supporting the conveyer in this form of manure distributer. This improvement is illustrated most clearly in Fig. 2. For a variety of reasons I prefer to use what is known as the "drag" conveyer instead of the "apron" conveyer. As this form of conveyer has less weight it is considerably simpler, is more durable and adapts itself to the twisting of the bed when driving over rough places. The chain 19 of this conveyer must be supported and therefore I have provided upon the under side of the bed of the machine a transverse supporting member designated 37 and illustrated as comprising a transverse pipe or rod mounted on depending brackets 38. This rod is provided at spaced points with the guides 39. These guides are in the form of rearwardly and forwardly extending wings, the upper face or the wings being slightly curved. These wings are disposed upon the pipe in such position that they will be inward at all times of the ends of the transverse slats or rods 20 of the conveyer. If these transverse slats or rods 20 are not properly guided over this support 37, they will stick and catch first on the support 37 and then when the conveyer passes through the bolster at the front end of the machine. To prevent these slats 20 from sticking when the conveyer passes through the bolster 40, I provide two bottom guides 41 fastened to the cross members of the bolster and over which the transverse bars, rods or slats 20 slide and two side guides 42 fastened to the longitudinal members 43 of the bolster. The bottom guides allow the bars 20 to slide over the cross members of the bolster, and inasmuch as these guides 41 are downwardly curved at each end, they engage these rods or slats 20 and guide them up properly over the bolster while the side guides prevent these slats or rods 20 from catching on the side members of the bolster. These side members 43 are longer than the space between the two bars and hence there is always one bar or slat 20 between these side members 43 when the next successive lath passes the guides. This prevents the conveyer from swaying too much and does not allow the rods or slats 20 to project beyond the side guides which would result in the rods catching upon the members 43. It will be seen that these side guides 42 are inclined and therefore act to center the rods 20 and the conveyer chains 19.

In construction of the character heretofore described, it is necessary to use a bent axle. Where a bent axle is used, ordinarily the pole is fastened to the front part of the axle and consequently the end of the pole that is fastened to the axle stands up much higher than if the axle were straight. This oftentimes causes considerable difficulty in turning as if the rear end of the pole be high, it will when making short turns stick under the framework of the machine on which it is used. In order to overcome this difficulty, we have attached to the bent axle 44, a casting or block 45 to which the rear end of the pole is attached. Preferably the axle is held to this block 45 by means of clips 46. It is necessary in constructions of this kind that self-alining bearings be used on the feed shaft mechanism. Roller or ball bearings are expensive and are difficult to properly repair, but the self-alining bearings shown in Fig. 6 are simple and can be readily repaired at any time.

As before stated, the shaft of the beater is mounted upon brackets 5. Each of these brackets has a downwardly extending arm 47, the lower end of which is formed with one-half or the base portion of a journal box designated 48. Attached to this half of the journal box is a cap 49, the two parts of the journal box being held in place by bolts 50. Disposed within the boxing so formed is a sleeve 51 through which the rear shaft of the conveyer passes. This sleeve 51 has a downwardly projecting pin 52 which fits within a perforation 53 formed in the cap 49 so that the sleeve can not turn around in the bearing. This perforation or cavity 53 is relatively large so that while the sleeve can not rotate, the sleeve may swing upon the pin. With a construction of this character, the only part that can wear out is the small journal or sleeve 51. It is obvious that this can be replaced at a small cost at any time desired and that it provides a very simple form of self-alining journal box without the necessity of using ball bearings or other expensive antifriction devices.

Manure distributers constructed in accordance with my invention have been found to be particularly effective in practice, and particularly so with regard to the feed. The proper feeding of the load to the distributing paddles or blades is most important, and it is particularly important that means should be provided for so regulating the feed as to provide for either a heavy or a relatively light scattering of the manure over the field. At the same time this feed should be even as otherwise the load will choke and block the distributers and not only this, but great strain would be placed upon the conveyer in the bottom of the body.

What I claim is:

1. In a manure distributer, the combination with a wagon box and an endless conveyer passing above and below the bottom of the box, of upper and lower spaced bolster members between which the conveyer passes, vertically disposed, centrally and forwardly inclined guides at each end of the bolster members adapted to center the conveyer, and longitudinally extending guides disposed in conjunction with the bolster members and with the inclined guides and limiting the lateral movement of the conveyer.

2. In a manure distributer, the combination with a wagon box and an endless conveyer passing above and beneath the floor of the box, of a transverse supporting rod mounted beneath the floor of the box and having longitudinally extending, laterally spaced, upwardly bowed guides, upper and lower spaced bolster members, longitudinally extending guides mounted upon the bolster members and having upwardly curved rear ends to guide the conveyer between the bolster members and lateral guides limiting the lateral movement of the conveyer.

3. In a manure distributer, the combination with a wagon box and an endless conveyer passing above and beneath the floor of the box, of a transverse supporting rod mounted beneath the floor of the box and having longitudinally extending laterally spaced, upwardly bowed guides, upper and lower spaced bolster members, longitudinally extending guides mounted upon the bolster members and having depressed rear ends to guide the conveyer between the bolster members, lateral guides limiting the lateral movement of the conveyer, and vertically disposed inclined guides arranged at the rear ends of the last named longitudinal guides to center the conveyer with relation thereto.

4. In a manure distributer, the combination with a wagon box and an endless conveyer passing above and beneath the floor of the box and comprising laterally spaced chains and transversely extending spaced rods, the ends of the rods projecting beyond the chains, of a transverse supporting rod mounted beneath the bottom of the box and over which the chains pass, said rod having longitudinally extending guides mounted thereon having depressed ends, upper and lower front and rear bolster members disposed at the forward end of the machine and between which said conveyer passes, longitudinally extending guides extending between the lower bolster members and having depressed rear ends, longitudinally extending lateral bolster members spaced from each other a distance slightly greater than the length of said conveyer rods and limiting the lateral movement of said rods, and vertically disposed inclined guides at the rear ends of said longitudinal bolster members and acting to center the said conveyer.

In testimony whereof I affix my signature in presence of two witnesses.

HENRY SYNCK. [L. S.]

Witnesses:
AL. MUELLER,
D. WM. FRICK.

---

Copies of this patent may be obtained for five cents each, by addressing the "Commissioner of Patents, Washington, D. C."